United States Patent
Modi et al.

(10) Patent No.: US 10,419,614 B2
(45) Date of Patent: *Sep. 17, 2019

(54) SYSTEM AND METHOD FOR PREDICTIVE ROUTING BASED ON A CUSTOMER JOURNEY PATIENCE

(71) Applicant: GENESYS TELECOMMUNICATIONS LABORATORIES, INC., Daly City, CA (US)

(72) Inventors: Hardik Modi, Folsom, CA (US); Nikolay Korolev, Concord, CA (US); Herbert Willi Artur Ristock, Walnut Creek, CA (US); Conor McGann, San Carlos, CA (US); Jeffery Karas, San Francisco, CA (US); Graeme Provan, Pacifica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/865,167

(22) Filed: Jan. 8, 2018

(65) Prior Publication Data

US 2018/0131809 A1 May 10, 2018

Related U.S. Application Data

(63) Continuation of application No. 15/251,191, filed on Aug. 30, 2016, now Pat. No. 9,866,695.

(51) Int. Cl.
*H04M 3/523* (2006.01)
*H04M 3/51* (2006.01)

(52) U.S. Cl.
CPC ....... *H04M 3/5232* (2013.01); *H04M 3/5175* (2013.01); *H04M 2203/408* (2013.01)

(58) Field of Classification Search
CPC ............ H04M 3/5232; H04M 3/5175; H04M 2203/408
USPC ....................................... 379/265.11, 266.03
See application file for complete search history.

(56) References Cited

U.S. PATENT DOCUMENTS

| | | | |
|---|---|---|---|
| 2005/0071211 A1 | 3/2005 | Flockhart et al. | |
| 2012/0008754 A1 | 1/2012 | Mukherjee et al. | |
| 2014/0140496 A1 | 5/2014 | Ripa et al. | |
| 2015/0003604 A1 | 1/2015 | McCormack et al. | |
| 2015/0189088 A1 | 7/2015 | Surridge et al. | |
| 2015/0373196 A1 | 12/2015 | Scott et al. | |
| 2016/0155080 A1 | 6/2016 | Gnanasambandam et al. | |

FOREIGN PATENT DOCUMENTS

KR   1020150131306 A    11/2015

OTHER PUBLICATIONS

International Search Report and Written Opinion for Application No. PCT/US2017/048728, dated Oct. 31, 2017, 17 pages.

*Primary Examiner* — Quynh H Nguyen

(57) ABSTRACT

A system includes a router to route an interaction by a customer to a contact center. A journey patience value is determined for the customer, where the journey patience value is based on a current journey stage of the customer. An action by the contact center is determined based on the determined journey patience value for the customer. The action is performed by the contact center based on the determined action.

19 Claims, 9 Drawing Sheets

SYSTEM AND METHOD FOR PREDICTIVE ROUTING BASED ON A CUSTOMER JOURNEY PATIENCE

CROSS-REFERENCE TO RELATED APPLICATIONS

This application is a continuation of U.S. patent application Ser. No. 15/251,191, filed on Aug. 30, 2016, now U.S. Pat. No. 9,866,695, the content of which is incorporated herein by reference.

BACKGROUND

Contact centers can handle sales, service and technical support for businesses offering products and or services to their customers and potential customers. Contact centers route the customer interactions to the contact center agents. Such interactions may include telephone calls, emails, text messages, chat messages, and the like. Contact centers traditionally employ skill-based routing for routing customer interactions. In traditional skill-based routing, the skill of an agent is one of the primary factors considered for determining whether the agent is equipped to deal with a particular interaction. The skill may relate to an agent's language proficiency, sales skill, certification, and the like.

BRIEF DESCRIPTION OF THE DRAWINGS

In association with the following detailed description, reference is made to the accompanying drawings, where like numerals in different figures can refer to the same element.

DETAILED DESCRIPTION

A system includes a router to route an interaction by a customer to a contact center. A journey patience value is determined for the customer, where the journey patience value is based on a current journey stage of the customer. An action by the contact center is determined based on the determined journey patience value for the customer. The action is performed by the contact center based on the determined action. In one example, the contact centers can route a call of a customer to one of multiple agent stations, or other available resource at the contact center. The contact center can determine an agent station based on the determined journey patience value for the customer. The contact center can then route the call to the determined agent station. In another example, the contact center can send an email to the customer, etc.

Figure 1:
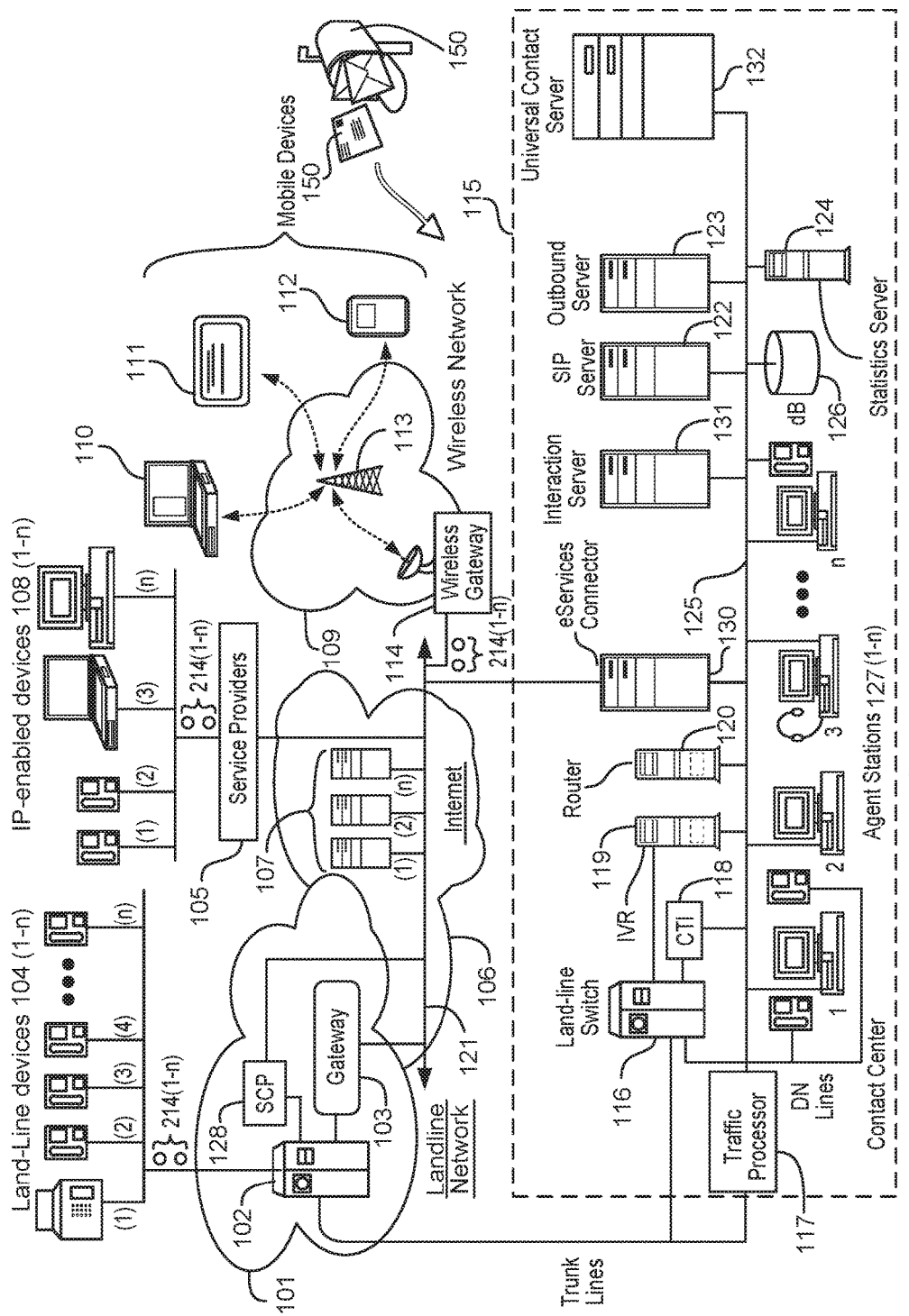
FIG. 1 is a block diagram illustrating an example contact center and a plurality of networks with interconnections where customers and agents may interact via a contact center.

FIG. 1 is a block diagram illustrating an example contact center 115 and a plurality of networks 101, 106, 109 with interconnections where customers and agents may interact via the contact center 115. Contact center 115 can be hosted by an enterprise that employs one or more contact centers. Customers and agents may perform interactions 100(1-n) with the contact center 115. The term customer includes potential customers and other consumers or other users of the contact center 115. The agents can interact with the customers via agent stations 127(1-n). The agent stations 127(1-n) can be located at one or more sites. The customers can use one or more communication appliances to contact the agent stations 127(1-n), including but not limited to land-line devices, e.g., telephones and facsimile machines 104 (1-n), IP-enabled devices 108 (1-n), through mobile appliances 110, 111 or 112, through the postal mail 150, etc. The interaction server 131 can serve interactions 100(1-n), e.g., digital media including email, chat, co-browse, social media, etc., to agents based on priority, e.g., via gold, silver, bronze and/or other service level agreements (SLA's), in which higher priority interactions 100(1-n) are served first. This can also apply to the Session Initiation protocol (SIP) Server 122 and CTI 118 (also known as a T-Server), described below, for handling voice traffic. In some examples, the contact center 115 can offer the customer a voice callback instead of the customer staying on the line until an agent station 127(1-n) is available.

Persons interacting through land-line devices 104 may connect firstly over trunk lines to a network switch 102. Switch 102 may interact with hardware and software of a service control point (SCP) 128, which may execute intelligent operations to determine to connect an incoming call to different ones of possible contact centers or to route an incoming call and facsimiles to an agent in a contact center or to an agent operating as a remote agent outside a contact center premises. Incoming calls and facsimiles in some circumstances may also be routed through a gateway 103 into the Internet network 106 as packet-switched calls. The interconnections in the Internet are represented by backbone 121. In this circumstance a call may be further processed as a packet-switched IP call. Equipment providing SCP services may also connect to the Internet and may allow SCP functionality to be integrated with Internet-connected servers and intelligence at contact centers.

A call from a land-line device 104 connecting to switch 102 may be routed to contact center 115 via trunk lines as shown to either a land-line switch 116 in contact center 115 or to a traffic processor 117. A contact center 115 may operate with the land-line switch 116 or the traffic processor, but in some circumstances may employ both incoming paths. Traffic processor 117 may provide session border controller (SBC) functionality, and may operate as a media gateway, or as a softswitch, e.g., a software switch.

Persons interacting through IP-enabled devices 108(1-n) may interact through the Internet network via backbone 121, enabled by a variety of service providers 105 which operate to provide Internet service for such devices. Devices 102(1) and 102(2) may be IP-enabled telephones, operating under a protocol such as SIP. Appliance 108(3) is illustrated as a lap-top computer, which may be enabled by software for voice communication over packet networks such as the Internet, and may also interact in many other ways, depending on installed and operable software, such as SKYPE or other VoIP solutions based on technologies such as WEBRTC. Similarly appliance 108(n) illustrated as a desk-top computer, may interact over the Internet in much the same manner as laptop appliance 108(3).

Many IP-enabled devices provide capability for customers to interact both in voice interactions 100(1-n) and text interactions 100(1-n), such as email and text messaging services and protocols. Internet network 106 may include a great variety of Internet-connected servers 107 and IP-enabled devices with Internet access may connect to individual ones of such servers to access services provided. Servers 107 in the Internet may include email servers, text messaging servers, social networking servers, Voice over IP servers (VoIP), and many more, many of which customers may leverage in interaction with a contact center such as contact center 115.

Another arrangement by which customers and agents may interact with contact centers is through mobile devices, illustrated in FIG. 1 by devices 110, 111 and 112. Such devices may include, but are not limited to, laptop computers, tablet devices and smart telephones. Such devices are not limited by a land-line connection or by a hard-wired Internet connection as shown for land-line devices 104 or IP-enabled devices 108, and may be used by customers and agents from changing geographic locations and while in motion. Devices 110, 111 and 112 are illustrated in FIG. 1 as connecting through a wireless network 109, which may occur through individual ones of cell towers 113 associated with base stations having gateways such as gateway 114 illustrated, the gateways connected to Internet backbone 121.

In some circumstances mobile devices, e.g., devices 110, 111 and 112, may connect to supplemental equipment. For example, cellular smartphones may be enabled for near-field communication such as BLUETOOTH, and may be paired with equipment in an automobile, which may in turn connect to the Internet network through satellite equipment and services, such as ON-STAR. Wireless communication may be provided as well in aircraft, which may provide an on-board base station, which may connect wirelessly to the Internet through either a series of ground stations over which an aircraft may pass in flight, or through one or more satellites.

Regardless of the variety of ways that Internet access may be attained by mobile devices, users of these devices may leverage Internet-connected servers for a great variety of services, or may connect through the Internet more directly to a contact center such as contact center 115, where users may interact as customers or as agents of the contact center.

The contact center 115 may represent one of a plurality of federated contact centers, a single center hosted by a single enterprise, a single contact center operating on behalf of a plurality of host enterprises, or any one of a variety of other arrangements. Architecture of an individual contact center 115 may also vary, and not all variations may be illustrated in a single diagram such as FIG. 1. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line devices 104, IP-enabled devices 108 or mobile devices represented by devices 110, 111 or 112. The CTI server 118 can be implemented with a GENESYS TELECOMMINATION SYSTEMS, INC. T-server. Calls may be queued in any one of a variety of ways before connection to an agent, either locally-based or remote from the contact center, depending on circumstances.

Incoming land-line calls to switch 116 may also be connected to an IVR server 119, which may serve to ascertain purpose of the caller and other information useful in further routing of the call to final connection, if further routing is needed. A router 120 may be leveraged for routing intelligence, of which there may be a great variety, and for association of the instant call with previous calls or future calls that might be made. The router 120 can be mapped to a GENESYS TELECOMMINATION SYSTEMS, INC. orchestration routing server, a universal routing server (URS) and/or a conversation manager.

Land-line calls thusly treated may be connected to agents at agent stations 127(1) or 127(2), each of which is shown as comprising a land-line telephone connected to switch 116 by destination number (DN) lines. Such calls may also be connected to remote agents using land-line telephones back through the land-line network. Such remote agents may also have computing appliances connected to contact center 115 for interaction with agent services such as scripting through an agent desktop application, also used by agents at agent stations 127. Agent station 127(3) is illustrated as having a connected headset from a computing device, which may execute telephony software to interact with packet switched calls. Agent station 127(n) is illustrated as having an IP-enabled telephone connected to LAN 125, through which an agent at that station may connect to packet-switched calls. Agent stations 127(1-n) may have a computerized appliance executing software to enable the using agent to transact by voice, email, chat, instant messaging, and any other known communication process. In other examples, the email or text etc. can be automatically generated by the contact center 115, without using an agent station 127(1-n) resource.

Incoming calls from land-line network 101 may alternatively be connected in contact center 115 through Traffic Processor 117, described briefly above, to LAN 125. In some circumstances Traffic Processor 117 may convert incoming calls to SIP protocol, and such calls may be further managed by SIP Server 122.

Incoming calls from IP-enabled devices 108 or from mobile devices 110, 111 or 112, and a wide variety of text-based electronic communications may come to contact center 115 through the Internet, arriving in the Contact Center at an eServices Connector 130. eServices Connector 130 may provide protective functions, such as a firewall may provide in other architecture, and may serve to direct incoming transactions to appropriate service servers. For example, SIP calls may be directed to SIP Server 122, and text-based transactions may be directed to an interaction server 131, which may manage email, chat sessions, Short Message Service (SMS) transactions, co-browsing sessions, and more.

The interaction server 131 may leverage services of other servers in the contact center, and available remotely as well. For example, SMS and email can be processed by the interaction server 131 and supported by a universal contact server 132 which interfaces with a database to store data on contacts, e.g., customers, including customer profiles and interaction history. The customer profile can include information about a level of service that the customer's interactions 100(1-n) are to receive, e.g., for distinguishing a customer segment (gold/silver/bronze) a particular interaction belongs to.

A statistics server 124 is illustrated in contact center 115, connected to LAN 125, and may provide a variety of services to agents operating in the contact center, and in some circumstances to customers of the contact center. Statistics may be used in contact center management to vary functionality in routing intelligence, load management, and in many other ways. A database dB 126 may be provided to archive interaction data and to provide storage for many of the activities in contact center 115. An outbound server 123 is illustrated and may be used to manage outbound campaigns in the contact center, wherein calls may be made to destinations from a campaign list, and answered calls may be connected directly or be queued to be connected to agents involved in the outbound campaigns.

The contact center 115 and connectivity of the networks 101, 106, 109 through which transaction is accomplished between customers and agents is exemplary, and there are a variety of ways that similar functionality might be attained with somewhat different architecture. The architecture illustrated is exemplary.

Contact centers may operate with a wide variety of media channels for interaction between agents and customers who call in to the centers. Such channels may enable voice interaction in some instances, and in other instances text-based interaction, which may include chat sessions, email exchanges, and text messaging. Mail and email are examples of interactions 100(1-n) for an agent to engage in some particular future or scheduled time.

Figure 2:
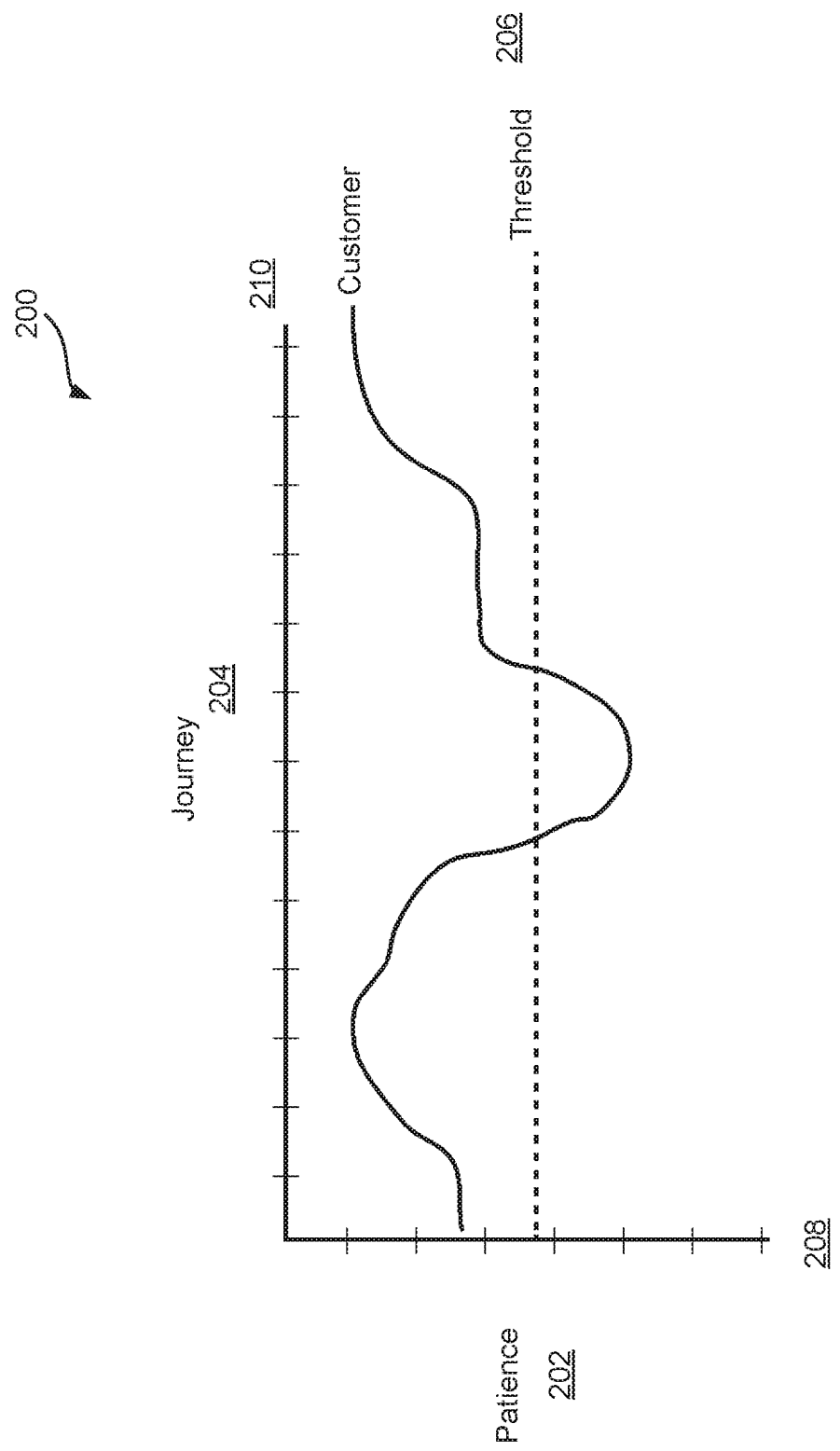
FIG. 2 is a graph of an example journey of the customer interacting with a contact center over time, and a journey patience of a customer along the journey.

FIG. 2 is a graph 200 of an example journey 204 of the customer interacting with a contact center 115 over time, and a journey patience 202 of a customer along the journey 204. The journey patience value 208 of the customer can increase and decrease over the course the journey 204. In one example, in the graph 200, the journey patience value 208 going up indicates an increasing customer patience and the journey patience value 208 going down indicates a decreasing customer patience, but other ways to indicate the journey patience value 208 can be used. Over time the journey 204 can include one or more of a sequence of journey stages 210, e.g., events with the customer for a company to proceed to an outcome with the customer. The journey stages 210 can represent multiple interactions along the journey 204 between the customer and the contact center 115 as they move towards a resolution. Some non-limiting examples of journeys are given below. For the sake of explanation the journey 204 is described in terms of customer contact with a single contact center 115, but the journey 204 can be handled by one or more contact centers in one or more locations, and can include contact centers 115 having agent stations 127(1-n) at one or more sites. The journey patience value 208 can be determined in various ways, for example, based on an implementation. For inbound calls staying in a queue there is a patience time which is the average time that a customer is willing to wait in the queue until abandonment. The longer this time the higher journey patience value 208 the customer has. A known algorithm may be used to estimate the journey patience value 208. In the journey 204, the journey patience value 208 can be based on the probability that a customer will leave the journey 204 at a determined time in the future when staying at a determined position in the journey 204. Additionally or alternatively, the journey patience value 208 of the customer can be affected by actions of the contact center 115, e.g., if the contact center 115 does or does not perform an action (make a call, send email, send text, etc.) at a determined time the customer's journey patience level 208 can increase or decrease.

In some examples, the journey patience value 208 for the journey may be derived/calculated by the contact center 115 based one or more factors, including but not limited to an observed rates that the customers abandon a call and/or the process, times that the customers stay on call and a reasonable outcome occurs, a time since a last contact center 115 interaction with the customer, a level of customer effort at different steps, a level of elapsed time of the journey, a desire of the customers, alternatives for the customers, customer satisfaction scores (CSAT), net promotor scores (NPS), overall duration of case processing (customer effort score), a number of journey stages, a number of different agents involved, a quality trend, e.g. quality getting better/worse with each journey stage 210 based on an unfriendly agent, incorrect information, long wait times, etc., a correlation with type of case/journey, whether more options are available for the customer, speech/text analysis of recorded interactions, history records of previous similar journeys, etc.

Other patience factors can include a number of steps in journey 204, a time period since resolving open question, a time period since interacting with the customer, a determined customer expectation for a return call, a frequency of customer callbacks which can indicate customer patience getting lower, etc. The patience threshold 206 may be identified for each intention type after which the NPS score drops. For instance, assume that for one of the intention types, it is observed that an average caller wait time is 24 hours (with 70% of the calls answered in less than 1 hour), and the NPS score drops sharply only after 48 hours. The journey patience value 208 for this intention type may be set as 40 hours. The example illustrates that customers are prepared to wait (for some time) for the right agent rather than settle for a lesser skilled agent. Therefore, given reliable short term forecasts of agent availability, and an estimate of customer's patience or tolerance level for waiting before abandoning or negatively impacting outcomes, that time flexibility may be exploited to do a more optimal interaction-agent station 127(1-n) match. In one example, measured time and effort can indicate that 85% of customers who get rate quote within 36 hours end up closing on the mortgage or the loan. A type of customer can also factor into the determined patience at a journey stage 210, for example, a second time home buyer may be more patient than first time home buyer, etc. In another example, a customer wiring funds may be willing to wait longer to talk to particular account representative versus a customer waiting for help to reconnect internet.

If a journey patience value 208 goes beyond, e.g., in this case below, a determined patience threshold 206 the contact center 115 may be at risk the customer ending a communication with the contact center 115, and/or losing the customer, e.g., the customer abandoning a product or a service of a company served by the contact center 115, etc. The patience threshold 206 need not be static and can change over the course of the course of the journey 204. In one example the contact center 115 can change the patience threshold 206 based on feedback from this or other journeys 204. In some examples, the contact center 115 can set the patience threshold 206 to try to maximize a satisfaction of the customer. The contact center 115 can consider the situation when setting a patience threshold 206. For example, a customer trying to dispute a bill may have a lower patience threshold 206 than a customer trying to obtain a loan. Additionally or alternatively, the contact center 115 can consider the journey 204 as journey stages 210 and/or in terms of the entire journey 204 when determining a journey patience value 208 of the customer. When the customer interacts with the contact center 115, the contact center 115 can determine an action to take based on journey patience value 208, available resources at the agent stations 127(1-n), and any other factors, etc. Additionally or alternatively, the contact center 115 can proactively contact the customer based on journey patience value 208, available resources at the agent stations 127(1-n), etc.

The patience threshold 206 of the customer can be influenced by a variety of factors at each journey stage 210. Factors can include, but are not limited to, brand values, competitors offerings, adjacent market experiences, previous experiences and the level of emotional attachment to the journey. Additionally or alternatively, at each journey stage 210 the level of importance of the patience threshold 206 to the customer and the business can be different. For example, for a low cost airline in which the journey stage 210 has nothing to do with low cost then it may not be an important journey stage 210 for the business. Therefore, the contact center 115 may not manage the journey 204 at this journey stage 210 unless it can influence the outcome rate. The patience threshold 206 can apply at all journey stages 210, e.g., face to face stages, self-service stages, research or anywhere where the customer had to provide effort.

Figure 3:
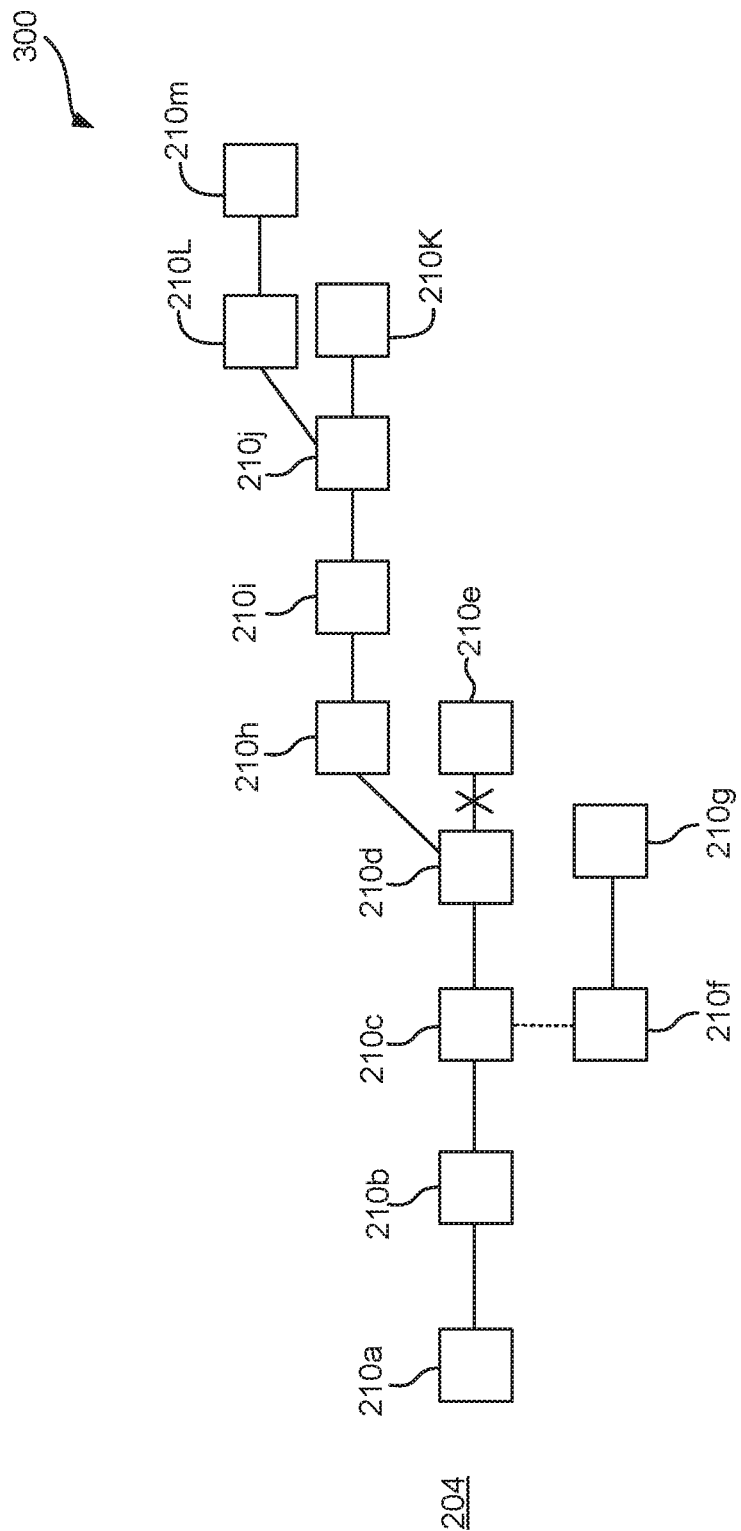
FIG. 3 is a block diagram of an example journey of the customer having journey stages.

FIG. 3 is a block diagram 300 of an example journey 204 of the customer over journey stages 210a-m. The contact center 115 can track one or more journey stages 210a-m of a customer along their journey 204 with the contact center 115, e.g., from a start of the journey stage 210a to an end journey stage 210m. Information about the journey stages 210a-m can be stored in memory 1522 (e.g., FIG. 6). In one example, at journey stage 210b, the contact center 115 can determine a next journey stage 210c based on one or more factors, including but not limited to, a determined journey patience value 208 of the customer at journey stage 210b and available resources at the agent stations 127(1-n). The contact center 115 can determine the journey patience value 208 for the customer based on, among other things, information about the customer at the current journey stage 210b of the journey 204. The information can include but is not limited to a history of previous contacts of the contact center 115 with the customer, including any positive and negative outcomes with the customer in the past. The contact center 115 can factor in other information about the customer, including information obtained in parallel journey stage(s) 210f and/or 210g.

Additionally or alternatively, the contact center 115 can determine at journey stage 210d, either journey stage 210e or journey stage 210h, for example based on one or more of journey patience value 208 of the customer, available resources at agent stations 127(1-n), a wait time for the agent stations 127(1-n), etc. For example, if for the next leg of journey 204 there are multiple agent station 127(1-n) options that the contact center 115 can select, then the contact center 115 can select the option that best matches current journey patience value 208. For example, if the customer's patience value 208 is high then the contact center 115 can use a path that requires higher patience, where the contact center 115 may have more capacity/resources. The contact center 115 can also change an order of journey stages 210h and 210i, for example, if possible to re-charge (increase) customer's journey patience value 208 by a journey stage 210i which is usually perceived well, or perform next a more negatively perceived activity for a customer with high journey patience value 208. Additionally or alternatively, a journey stage 210e can be adjusted when the contact center predicts a customer's abandonment risk based on the journey patience value 208, e.g., to keep same agent, assign a better agent, focus on completing the case rather than trying to cross-sell/up-sell, provide a preferred treatment, provide a special offer, etc. The contact center 115 can determine possible abandonment by the customer by monitoring active and/or passive actions of the customer. Active actions include the customer informing the contact center 115 about an intention to cancel the case. Passive actions include the customer not responding to a contact center 115 request, e.g., not answering emails. The contact center 115 can use data analytics to determine influential parameters for abandonment.

A determined ordering of the journey stages 210a-m can also achieve incremental changes to the journey patience value 208 and drive engagement with the customer. The journeys 204 can include concatenated journey stages 210a-m, nested journey stages 210a-m, defined journey stages 210a-m, modeling journey stages 210a-m, etc. with a goal of a journey patience value 208 not exceeding a patience threshold 206 of the customer. Additionally or alternatively, at journey stage 210i, the contact center 115 can take the customer to journey stage 210k and parallel journey stages 210l and 210m, etc., for example to end one journey and start the customer on a new journey, e.g., a new product and/or service.

Referring also to FIG. 2, one non-limiting example of a journey 204 includes a customer applying for a mortgage or other loan at a bank. The journey stages 210 include, but are not limited to, an inquiry, a credit check, a rate quote, loan paperwork, a house appraisal, and closing the loan or abandoning the loan, etc. Another example of a journey 204 includes refinancing with the bank. The refinancing process can include journey stages 210, and the refinancing itself can be a journey stage 210 within a bigger journey of a customer's lifetime at the bank. The contact center 115 can determine the entry and exit criteria for the journey 204 and the steps in between, e.g., from a refinance request being initiated to closing the refinance or the customer abandoning the process. As with any journey 204, the customer or the company can initiate the journey 204, or an automated process can initiate the journey 204.

Another example of a journey 204 is an insurance claim. The journey stages 210 include, but are not limited to, the insurance company meeting the customer to look at the car, house, apartment, etc. having a claim, the car being towed, the customer making the claim, the insurance company asking for more details, the customer requesting a returned call, the other party/insurance company becoming involved in the claim, presenting options for fixing car, the car being fixed, etc. Along the journey 204, the contact center 115 can determine that the journey patience value 208 of the customer, e.g., which can be affected by good responsiveness and unresponsiveness, provide the customer options to communicate with the contact center 115 over different medias and channels, can determine a frequency of updates to the customer, etc. For example, the longer contact center 115 waits to return a call of the customer, the more anxious the customer may get. The contact center 115 can determine that a first contact with customer can include a short wait time since a journey patience value 208 is at or beyond the patience threshold 206, and subsequent calls can include longer times since the patience value of the customer is higher. In some examples, during an insurance renewal journey 204 between the customer and the insurance company, the contact center 115 can identify the parallel claims journey 204f, g with the same customer and determine a nest best journey stage 210 based on information about the parallel journey. For example, the contact center 115 can route the customer to an agent station 127(1-n) having an agent with specialized skills for renewals when a claim is pending or suggest that an agent station 127(1-n) call the customer, etc. Other next steps are possible.

Another non-limiting example of a journey 204 includes a customers' dealing with a service provider, e.g., mobile, internet, etc. The contact center 115 can consider the different journey stage 210 when determining journey patience values 208 along the journey 204. Example journey stages 210 include sign up, outages, discounts, increases in price, etc. A parallel or concurrent journey 204 can include telephony, television, etc. In one example, the contact center 115 can inform the agent station 127(1-n) to try to fix any issues with current services of the customer before closing a sale for other services.

Figure 4:
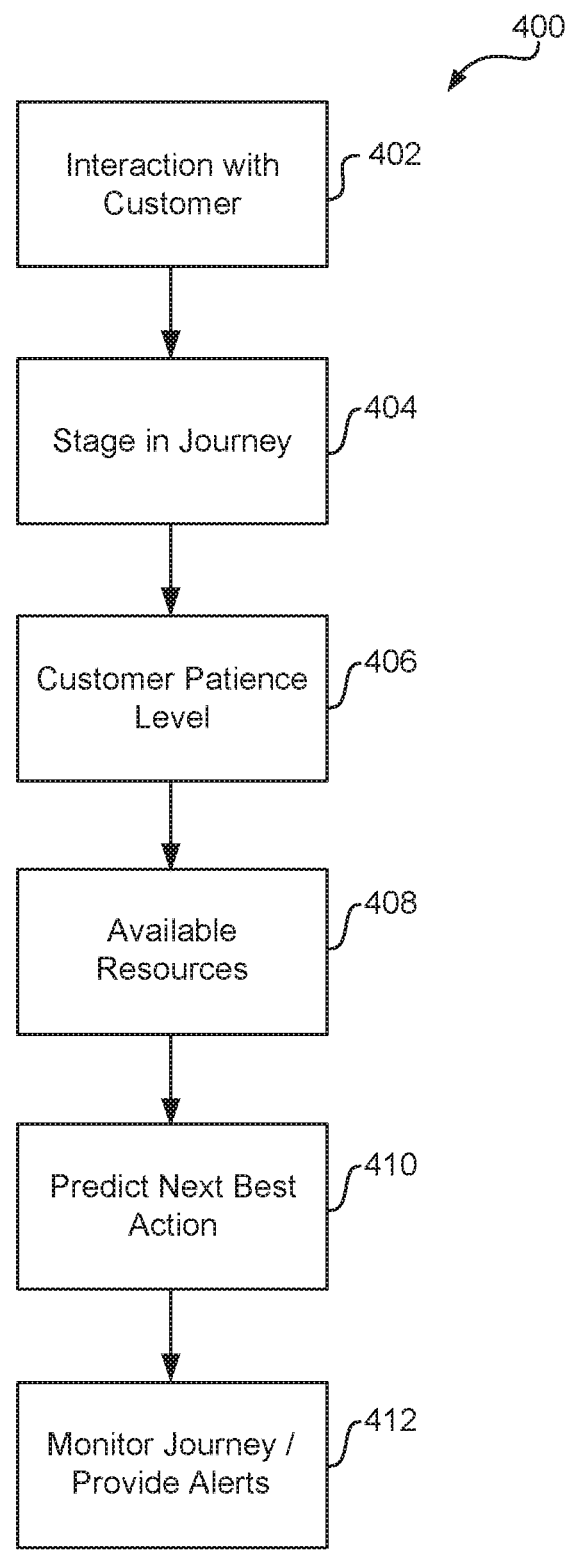
FIG. 4 is a flowchart of an example logic for predictive routing of a customer based on a customer's journey.

FIG. 4 is a flowchart of an example logic 400 for predictive routing of a customer based on a customer's journey 204. During the journey 204 the customer interacts with the contact center 115 (402). The contact center 115 can determine the current journey stage 210 of the journey 204 for the customer (404). In some implementations, the router 120 can access the statistics server 124 to access the information about the journey 204 for the customer. The contact center 115 can determine a customer journey patience value 208 for customer based on the journey stage 210 (406). In one implementation, to determine journey patience values 208 at different journey stages 210 along the journey 204, the contact center 115 can analyze records of similar customers currently going through the process or that went through the process. The contact center 115 can determine journey patience values 208 based on implicit information, e.g., not closing a sale with determined time and explicit information, e.g., a customer hang up.

The contact center 115 can also determine the next action to take, e.g., by determining available resources at the contact center 115, e.g., available agent stations 127(1-n) or other resources, when routing the customer (408). The next action can include other actions, e.g., sending an automatically generated email to the customer, offering a callback to the customer, putting the customer on hold, etc. With information about one or more of the available resources, the current journey stage 210, and the customer journey patience value 208, the contact center can determine a next best action for handling the customer (410). For example, contact center 115 can immediately route a waiting customer to a determined agent station 127(1-n), leave the customer in the waiting queue for the time being, e.g., to wait for an agent station 127(1-n) with a determined specialty to become available, suggest a callback option to the customer, suggest an online option to the customer, send a notification by email with a specified message, etc. The contact center 115 can monitor the journey 204 of the customer and provide alerts to the agent stations 127(1-n) when necessary, e.g., upon detection of a determined journey patience value 208 of the customer going beyond a threshold (412).

The journey patience value 208 can change over time. When the journey patience value 208 goes beyond a determined patience threshold 206 the contact center 115 can perform proactive action to attempt to avoid a negative outcome with the customer, e.g., losing the customer's business. During the journey 204, the contact center 115 can obtain and store information about the journey 204 of the customer as the interactions happen, e.g., call, email, visit to a website, etc., at determined times during the day, daily, weekly, monthly, etc. and/or at some other determined time interval, whether periodic or not. The contact center 115 can track desires of the customer, urgency, patience for determined actions, likelihood customer abandons calls, a desire of business, etc. The contact center 115 can link the patience value 208 to an identification (ID) of the customer.

Figure 5:
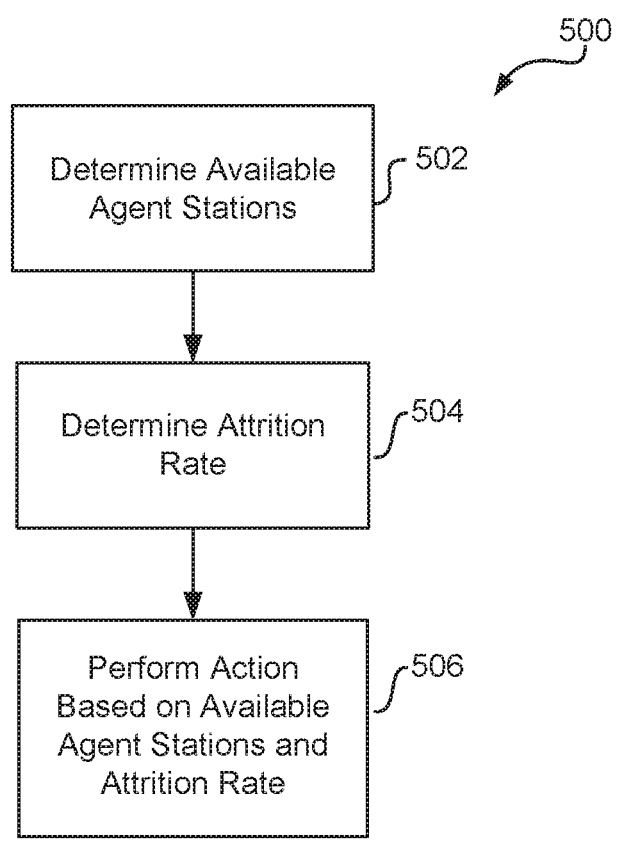
FIG. 5 is a flow chart of an example logic for serving a customer interaction to an agent station based on attrition rate.

FIG. 5 is a flow chart of an example logic 500 for serving a customer interaction to an agent station 127(1-n) based on attrition rate. The contact center 115 can determine available agent stations 127(1-n), or agent stations 127(1-n) that the contact center 115 predicts are becoming available (502). The contact center 115 can also determine an attrition rate, e.g., a number of customers abandoning a particular service during specified time period (504). Attrition rate can be predicted based on the customer history and profile. The contact center 115 can re-estimate the attrition rate in each journey stage 210 along a customer business process and assign determined actions toward a customer in order to improve the customer's situation with the business when necessary. The contact center 115 can assign attrition rate zones: 1) green zone: attrition rate <10%, 2) yellow: 10<=attrition rate <50%, 3) red: attrition rate >=50%. If a customer staying in journey stage 210 X is located in a red attrition rate zone, the contact center 115 can predict how the journey 204 will change after each potential action. The contact center 115 can then select and execute an optimal action including, but not limited to, 1) do nothing, 2) call the customer 3) send a notification by email with a determined message, etc. (506). The contact center 115 can make attrition rate predictions based on the historical data of available customers and data mining or machine learning processes. The contact center 115 may have the information saved about behavior of some customers that were in approximately the same situations as the current customer, which can help predict future behavior.

Figure 6:
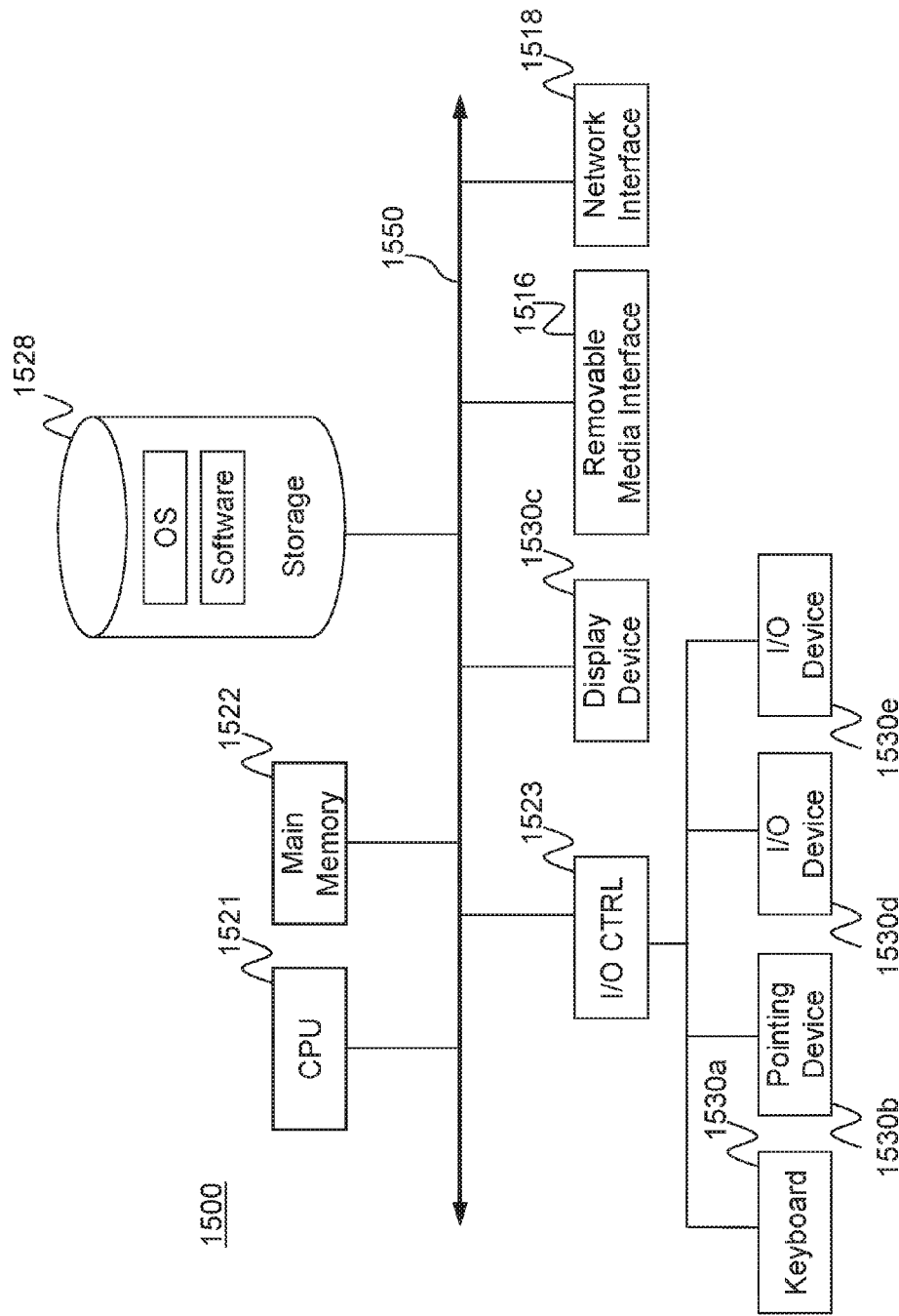
FIGS. 6-10 are block diagrams of an example computing device(s) of the contact center.
Figure 7:
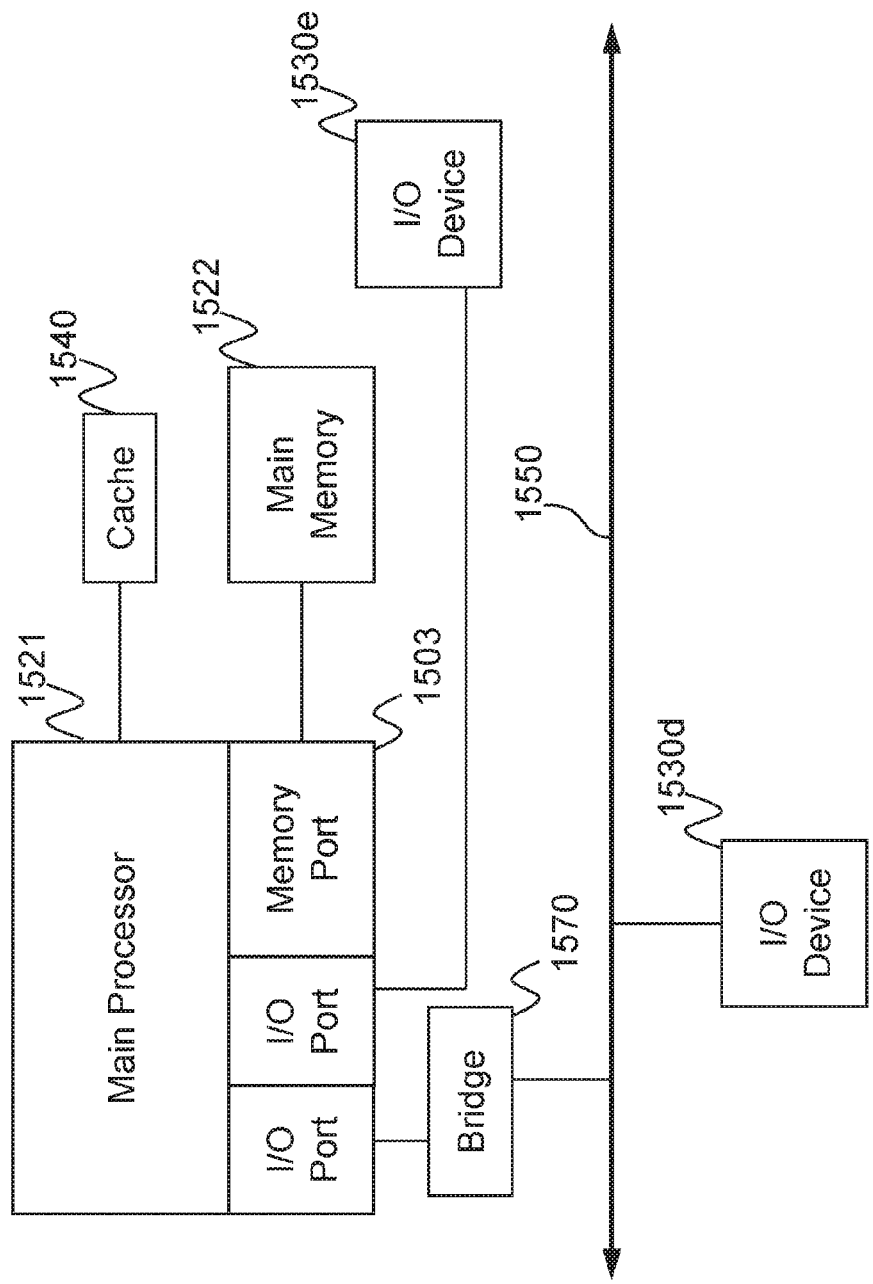
Figure 9:
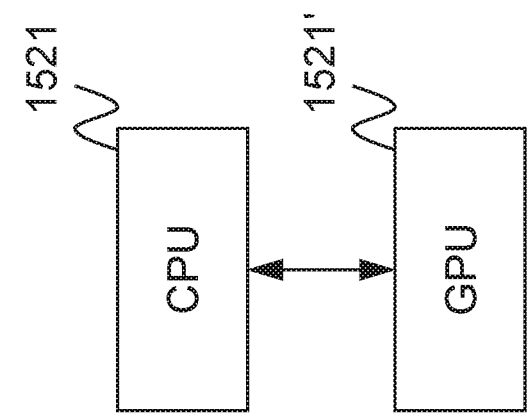

FIGS. 6-10 are block diagrams of an example computing device(s) of the contact center. FIG. 6 and FIG. 7 depict block diagrams of a computing device 1500 as may be employed in exemplary embodiments of the present invention. Each computing device 1500 includes a central processing unit 1521 and a main memory unit 1522. As shown in FIG. 6, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 7, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 6, the central processing unit 1521 communicates with the main memory 1522 via a system bus 1550. As shown in FIG. 7, the central processing unit 1521 may also communicate directly with the main memory 1522 via a memory port 1503.

FIG. 6 depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 6, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 7 depicts an embodiment of a computer 1500 in which the central processing unit 1521 communicates directly with I/O device 1530e. FIG. 7 also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 6, may control the I/O devices. The I/O controller may control one or more I/O devices such as a keyboard 1530a and a pointing device 1530b, e.g., a mouse or optical pen.

Referring again to FIG. 6, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 6 and FIG. 7 may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 8:
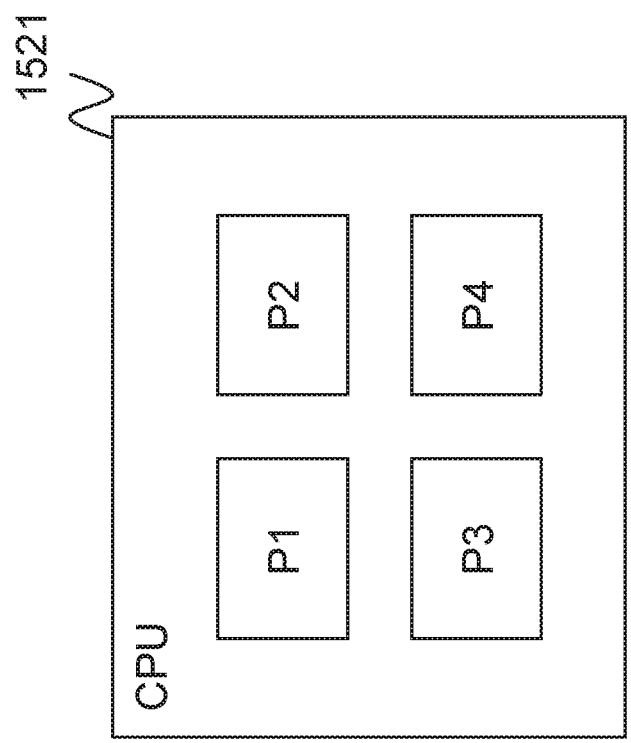

As shown in FIG. 8, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 9, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 10:
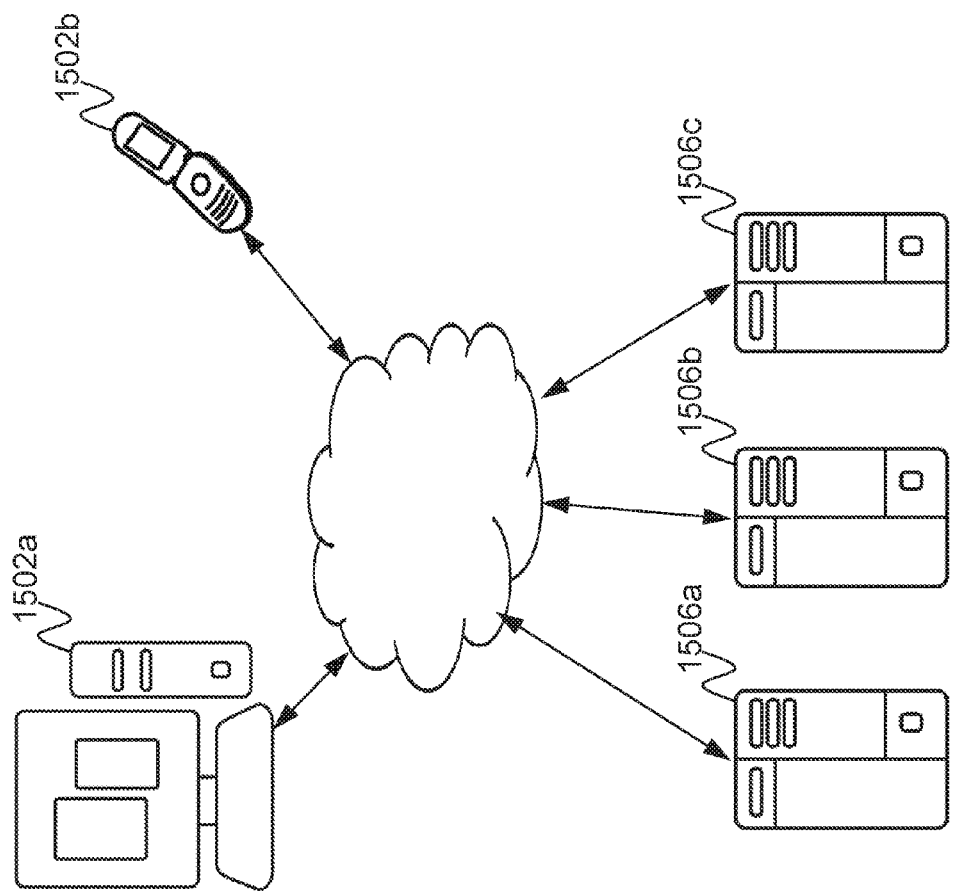

A computing device may be one of a plurality of machines connected by a network, or it may comprise a plurality of machines so connected. FIG. 10 shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 10, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 10 may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV). The systems and methods described above may be implemented in many different ways in many different combinations of hardware, software, firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The systems and methods can also include a display device, an audio output and a controller, such as a keyboard, mouse, trackball, game controller, microphone, voice-recognition device, or any other device that inputs information. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. The systems and methods can be implemented over a cloud, for example using AMAZON AWS and other products or services.

While various embodiments have been described, it can be apparent that many more embodiments and implementations are possible. Accordingly, the embodiments are not to be restricted.

The invention claimed is:

1. A system for processing interactions for a customer contact center, the system comprising:
    a first electronic device associated with the contact center;

a second electronic device associated with the contact center;
a router to route interactions for establishing interaction sessions between customer end user devices and contact center resources including the first electronic device and the second electronic device;
a processor coupled to the first and second electronic devices; and
a memory, where the memory stores instructions, which when executed by the processor, causes the processor to:
identify a journey embarked by a customer, the journey being defined by a series of preset journey stages, the series of preset journey stages including a start stage and an end stage;
identify a first journey stage of the series of preset journey stages;
in response to identifying the first journey stage, transmit a first electronic signal to invoke a first interaction session between an end user device of the customer and the first electronic device associated with the contact center;
process historical information of other journeys monitored for the contact center;
determine, based on the historical information, a journey patience value for the customer for the first journey stage;
automatically select a second journey stage of the series of preset journey stages in response to determining that the journey patience value is a first value;
automatically select a third journey stage of the series of preset journey stages in response to determining that the journey patience value is a second value different from the first value; and
in response to the selected second or third journey stage, transmit a second electronic signal to establish a second interaction session between the end user device of the customer and the second electronic device associated with the contact center.

2. The system of claim 1, wherein the first interaction session or the second interaction session is a call of the customer, wherein the first or second electronic signal causes the processor to route the call to respectively the first or second electronic device associated with the contact center.

3. The system of claim 1, wherein the first interaction session or the second interaction session in sending of an email, wherein the first or second electronic signal causes the processor to send the email to the customer.

4. The system of claim 1, where the first journey stage includes a history of positive and negative outcomes with the customer.

5. The system of claim 1, wherein the instructions further cause the processor to automatically select the second or third journey stage based on available resources at the contact center.

6. The system of claim 1, wherein the instructions further cause the processor to automatically select the second or third journey stage based on a wait time of resources at the contact center.

7. The system of claim 1, wherein the instructions further cause the processor to provide the customer options to communicate with the contact center over different medias or channels based on the journey patience value.

8. The system of claim 1, wherein the instructions further cause the processor to determine a frequency of updates to the customer based on the journey patience value.

9. The system of claim 1, wherein the determined patience level is based on similar journeys of other customers.

10. The system of claim 1, wherein the instructions further cause the processor to provide an alert to an agent station in response to the determined journey patience value going beyond a threshold.

11. The system of claim 1, wherein the instructions further cause the processor to automatically select the second or third journey stage based on an attrition rate.

12. The system of claim 1, wherein the transmitting of the first electronic signal or the second electronic signal is for proactively initiating contact with the customer over a communication medium.

13. A method for processing interactions for a customer contact center, the method comprising:
identifying, by a processor, a journey embarked by a customer, the journey being defined by a series of preset journey stages, the series of preset journey stages including a start stage and an end stage;
identifying, by the processor, a first journey stage of the series of preset journey stages;
in response to identifying the first journey stage, transmitting a first electronic signal to invoke a first interaction session between an end user device of the customer and a first electronic device associated with the contact center;
processing, by the processor, historical information of other journeys monitored for the contact center;
determining, by the processor, based on the historical information, journey patience value for the customer for the first journey stage;
automatically selecting, by the processor, a second journey stage of the series of preset journey stages in response to determining that the journey patience value is a first value;
automatically selecting, by the processor, a third journey stage of the series of preset journey stages in response to determining that the journey patience value is a second value different from the first value; and
in response to the selected second or third journey stage, transmitting, by the processor, a second electronic signal to establish a second interaction session between the end user device of the customer and the second electronic device associated with the contact center.

14. The method of claim 13, further comprising determining the journey patience value based on a journey stage occurring in parallel to the first journey stage.

15. The method of claim 13, wherein the automatically selecting of the second or third journey stage is based on available resources at agent stations.

16. The method of claim 13, wherein the automatically selecting of the second or third journey stage is based on a wait time of agent stations.

17. The method of claim 13, further comprising providing the customer options to communicate with the contact center over different medias or channels based on the journey patience value.

18. The method of claim 13, further comprising determining a frequency of updates to the customer based on the journey patience value.

19. The method of claim 13, further comprising providing an alert to an agent station in response to the determined journey patience value going beyond a threshold.

* * * * *